| (12) | United States Patent | (10) Patent No.: | US 12,502,120 B2 |
|---|---|---|---|
| | Yoshihara et al. | (45) Date of Patent: | Dec. 23, 2025 |

(54) MUSCLE RELAXATION MONITORING APPARATUS AND PATIENT MONITOR

(71) Applicants: NIHON KOHDEN CORPORATION, Tokyo (JP); Shunichi TAKAGI, Tokyo (JP); KAWASAKI GAKUEN EDUCATIONAL FOUNDATION, Okayama (JP)

(72) Inventors: Hiroshi Yoshihara, Tokorozawa (JP); Shigeyoshi Kitamura, Tokorozawa (JP); Kazuya Nagase, Tokorozawa (JP); Shunji Iwata, Tokorozawa (JP); Shunichi Takagi, Tokyo (JP); Hideki Nakatsuka, Kurashiki (JP)

(73) Assignees: NIHON KOHDEN CORPORATION, Tokyo (JP); Shunichi Takagi, Tokyo (JP); KAWASAKI GAKUEN Educational Foundation, Okayama (JP)

( * ) Notice: Subject to any disclaimer, the term of this patent is extended or adjusted under 35 U.S.C. 154(b) by 879 days.

(21) Appl. No.: 17/076,503

(22) Filed: Oct. 21, 2020

(65) Prior Publication Data

US 2021/0128008 A1 May 6, 2021

(30) Foreign Application Priority Data

Oct. 31, 2019 (JP) .................................. 2019-198593

(51) Int. Cl.
*A61B 5/389* (2021.01)

(52) U.S. Cl.
CPC .................................... *A61B 5/389* (2021.01)

(58) Field of Classification Search
CPC ......... A61B 5/389; A61B 5/395; A61B 5/397; A61B 5/4821; A61B 5/4848
See application file for complete search history.

(56) References Cited

U.S. PATENT DOCUMENTS

| 8,983,613 B2 | 3/2015 | Kamataki et al. | |
|---|---|---|---|
| 2004/0254617 A1* | 12/2004 | Hemmerling | .......... A61B 7/006 607/48 |
| 2013/0204097 A1* | 8/2013 | Rondoni | .............. A61B 5/6822 600/453 |
| 2013/0204156 A1* | 8/2013 | Hampton | ............. A61B 5/4848 600/546 |
| 2017/0172492 A1* | 6/2017 | Tanaka | ................. A61B 5/4519 |

FOREIGN PATENT DOCUMENTS

JP 2006326050 A 12/2006

* cited by examiner

*Primary Examiner* — Jennifer Robertson
*Assistant Examiner* — Nidhi N Patel
(74) *Attorney, Agent, or Firm* — Sughrue Mion, PLLC

(57) ABSTRACT

A muscle relaxation monitoring apparatus includes: a stimulating circuit that stimulates a nerve of a living body; a signal detecting circuit that detects an electric signal generated by a muscle reacting to the stimulation performed by the stimulating circuit; a reaction time calculating circuit that calculates a reaction time which elapses from the stimulation of the nerve by the stimulating circuit until the electric signal is detected by the signal detecting circuit; and a relaxation degree determining circuit that determines a muscle relaxation degree of the living body based on the length of the reaction time calculated by the reaction time calculating circuit.

20 Claims, 6 Drawing Sheets

MUSCLE RELAXATION MONITORING APPARATUS AND PATIENT MONITOR

CROSS-REFERENCE TO RELATED APPLICATIONS

The present application claims priority from Japanese Patent Application No. 2019-198593, filed Oct. 31, 2019, the entire content of which is incorporated herein by reference.

TECHNICAL FIELD

The presently disclosed subject matter relates to a muscle relaxation monitoring apparatus and a patient monitor.

BACKGROUND ART

A muscle relaxation monitoring apparatus of the so-called electromyogram type that electrically stimulates a nerve leading to a predetermined muscle of a living body, and that monitors the degree of muscle relaxation based on an electric signal generated by the muscle reacting to the stimulation has been proposed. In medical sites, by contrast, a muscle relaxation monitoring apparatus of the acceleration sensitive type is widely used, and a method of determining the degree of muscle relaxation is established. It is considered that, also in a muscle relaxation monitoring apparatus of the electromyogram type, the degree of muscle relaxation is determined in the same or similar method in that of the acceleration sensitive type.

As a technique for determining the degree of muscle relaxation by a muscle relaxation monitoring apparatus of the acceleration sensitive type, for example, JP2006-326050A discloses a muscle relaxation status display monitor that can correctly check the muscle relaxation status and estimate the transition of the status. The muscle relaxation status display monitor performs Train-Of-Four (TOF) stimulation in which a predetermined muscle is successively stimulated four times, and calculates the TOF ratio, the TOF count, and the like, so that the degree of muscle relaxation can be accurately determined.

However, the muscle relaxation status display monitor of JP2006-326050A must successively stimulate four times a predetermined muscle in order to determine the degree of muscle relaxation. In a muscle relaxation monitoring apparatus of the electromyogram type, the degree of relaxation of a muscle is calculated based on an electric signal generated by the muscle. When an electric device such as an electrosurgical knife is used during four stimulations, for example, noises may enter the electric signal. Therefore, it is requested to develop a technique for accurately determining the degree of muscle relaxation (hereinafter, the degree of muscle relaxation is referred to as the muscle relaxation degree) with a reduced number of stimulations.

SUMMARY

It is an object of the presently disclosed subject matter to solve the problem of the prior art, and to provide a muscle relaxation monitoring apparatus and patient monitor that accurately determine the muscle relaxation degree with a reduced number of stimulations.

The muscle relaxation monitoring apparatus of the presently disclosed subject matter may include: a stimulating section that stimulates a nerve of a living body; a signal detecting section that detects an electric signal generated by a muscle reacting to the stimulation performed by the stimulating section; a reaction time calculating section that calculates a reaction time which elapses from the stimulation of the nerve by the stimulating section until the electric signal is detected by the signal detecting section; and a relaxation degree determining section that determines a muscle relaxation degree of the living body based on a length of the reaction time calculated by the reaction time calculating section.

The patient monitor of the presently disclosed subject matter may include: a stimulating section that stimulates a nerve of a living body; a signal detecting section that detects an electric signal generated by a muscle reacting to the stimulation performed by the stimulating section; a reaction time calculating section that calculates a reaction time which elapses from the stimulation of the nerve by the stimulating section until the electric signal is detected by the signal detecting section; and a relaxation degree determining section that determines a muscle relaxation degree of the living body based on a length of the reaction time calculated by the reaction time calculating section.

According to the presently disclosed subject matter, the relaxation degree determining section determines the muscle relaxation degree of the living body based on the length of the reaction time which elapses from the stimulation of the nerve by the stimulating section until the electric signal is detected by the signal detecting section.

DESCRIPTION OF EMBODIMENTS

Hereinafter, embodiments of the presently disclosed subject matter will be described with reference to the accompanying drawings.

Embodiment 1

Figure 1:
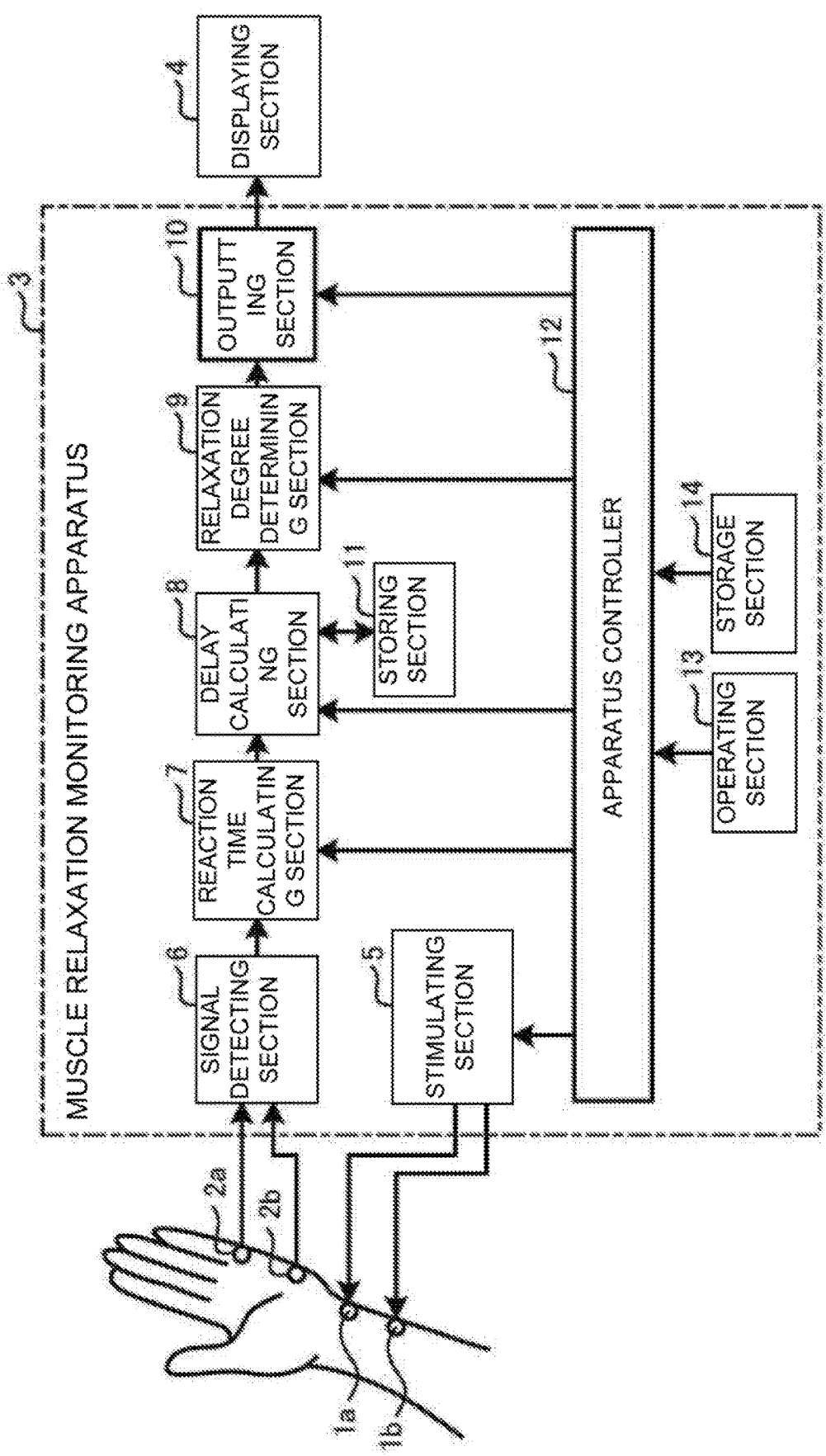
FIG. 1 is a block diagram illustrating the configuration of a muscle relaxation displaying apparatus including a muscle relaxation monitoring apparatus of Embodiment 1 of the presently disclosed subject matter.

FIG. 1 illustrates the configuration of a muscle relaxation displaying apparatus including a muscle relaxation monitoring apparatus of Embodiment 1 of the presently disclosed subject matter. The muscle relaxation displaying apparatus may include a pair of simulation electrodes 1a and 1b, a pair of detection electrodes 2a and 2b, the muscle relaxation monitoring apparatus 3, and a displaying section 4.

The simulation electrodes 1a and 1b are placed correspondingly to a nerve controlling a predetermined muscle of a living body, and output an electrical simulation to the nerve to simulate the muscle. Therefore, one of the simulation electrodes 1a and 1b functions as an anode, and the other electrode functions as a cathode. For example, the simulation electrodes 1a and 1b may be placed correspondingly to the ulnar nerve or the like.

The detection electrodes 2a and 2b are placed correspondingly to the predetermined muscle, and detect an electric signal generated by the muscle that reacts to the electrical stimulation applied through the simulation electrodes 1a and 1b. Therefore, one of the detection electrodes 2a and 2b functions as an anode, and the other electrode functions as a cathode. For example, the detection electrodes 2a and 2b may be placed correspondingly to the adductor pollicis muscle, the abductor digiti minimi muscle, or the like.

The muscle relaxation monitoring apparatus 3 may include a stimulating section 5 and a signal detecting section 6, and a reaction time calculating section 7, a delay calculating section 8, a relaxation degree determining section 9, and an outputting section 10 are sequentially connected to the signal detecting section 6. A storing section 11 is connected to the delay calculating section 8. An apparatus controller 12 is connected to the stimulating section 5, the reaction time calculating section 7, the delay calculating section 8, the relaxation degree determining section 9, and the outputting section 10. An operating section 13 and a storage section 14 are connected to the apparatus controller 12. The stimulating section 5 is connected to the simulation electrodes 1a and 1b, the signal detecting section 6 is connected to the detection electrodes 2a and 2b, and the outputting section 10 is connected to the displaying section 4.

The stimulating section 5 applies a voltage to the simulation electrodes 1a and 1b to electrically stimulate a nerve connected to a muscle in a predetermined portion of the living body.

The signal detecting section 6 sequentially receives electric signals generated from the living body, through the detection electrodes 2a and 2b, and detects the electric signal generated by the muscle reacting to the stimulation performed by the stimulating section 5. Specifically, the signal detecting section performs a differential process on the electric signals obtained through the detection electrodes 2a and 2b, and detects the waveform of an electric signal that is generated by the process, as the electric signal generated by the muscle.

The reaction time calculating section 7 calculates a reaction time that elapses from the stimulation of the nerve by the stimulating section 5 until the electric signal is detected by the signal detecting section 6, based on the stimulation time when the stimulating section 5 stimulates the nerve, and the detection time when the signal detecting section 6 detects the electric signal. Information of the stimulation time, and that of the detection time are supplied from the apparatus controller 12. Here, the reaction time calculating section 7 calculates a reaction time that elapses from a stimulation of the nerve by the stimulating section 5 before administration of a muscle relaxant agent, until the electric signal is detected by the signal detecting section 6, as a pre-administration reaction time. Moreover, the reaction time calculating section 7 calculates a reaction time that elapses from a stimulation of the nerve by the stimulating section 5 after administration of the muscle relaxant agent, until the electric signal due to the stimulation of the nerve is detected by the signal detecting section 6, as a post-administration reaction time.

The storing section 11 sequentially stores the pre-administration reaction time and post-administration reaction time that are calculated by the reaction time calculating section 7.

Based on the post-administration reaction time calculated by the reaction time calculating section 7, and the pre-administration reaction time stored in the storing section 11, the delay calculating section 8 calculates the delay of reaction of the muscle after administration of the muscle relaxant agent with respect to the pre-administration, i.e., the muscle reaction delay due to administration of the muscle relaxant agent.

The relaxation degree determining section 9 determines the muscle relaxation degree based on the muscle reaction delay due to administration of the muscle relaxant agent that is calculated by the delay calculating section 8. Here, the muscle relaxation degree indicates the degree of relaxation of a muscle, and is set so that the larger the muscle reaction delay, the higher the muscle relaxation degree.

The outputting section 10 outputs the muscle relaxation degree that is determined by the relaxation degree determining section 9, to the displaying section 4.

The apparatus controller 12 controls the sections of the muscle relaxation monitoring apparatus 3 based on instructions that are input from the operating section 13 by the user.

The operating section 13 is used for inputting instructions given by the user, and may be formed by buttons, a touch panel, a keyboard, a mouse, a track ball, or the like.

The storage section 14 stores operation programs and the like, and may use a recording medium such as a hard disk, a flexible disk, an MO, an MT, a RAM, a CD-ROM, a DVD-ROM, an SD card, a CF card, or a USB memory, or a server or the like.

The reaction time calculating section 7, the delay calculating section 8, the relaxation degree determining section 9, and the apparatus controller 12 are configured by a CPU and operation programs that cause the CPU to execute various processes, but alternatively may be configured by digital circuits.

The displaying section 4 may include a display device, and displays the muscle relaxation degree that is output from the outputting section 10. For example, the displaying section 4 may be configured by a patient monitor or an electrocardiogram monitor.

Next, a method of calculating the reaction time by the reaction time calculating section 7 will be described in detail.

Based on the electric signal that is detected by the signal detecting section 6, the reaction time calculating section 7 detects the peak of the waveform of the signal, and calculates the reaction time that elapses from a stimulation of a muscle until the muscle reacts to the stimulation, based on the position of the detected peak.

Figure 2:
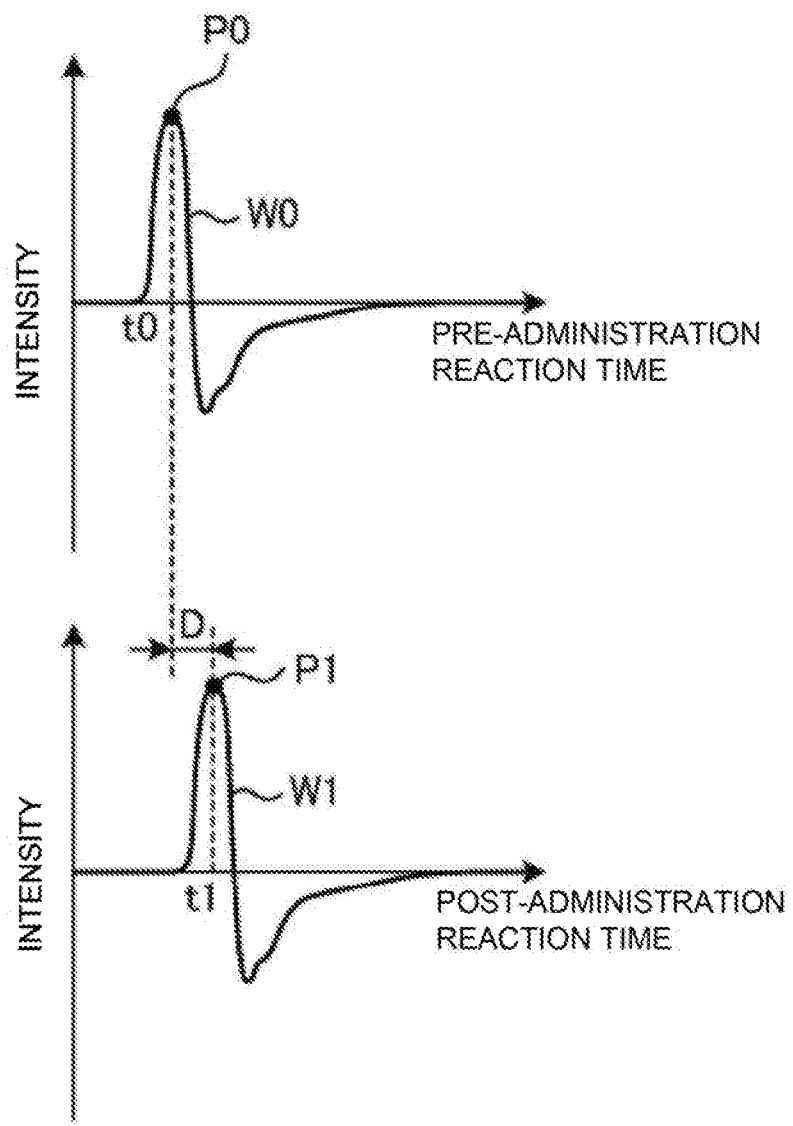
FIG. 2 illustrates the waveforms of electric signals that are detected by a signal detecting section before and after administration of a muscle relaxant agent.

As illustrated in FIG. 2, based on the electric signal that is detected by the signal detecting section 6 as a result of a stimulation which, before administration of the muscle relaxant agent, is performed on a muscle by the stimulating section 5, for example, the reaction time calculating section 7 detects a positive peak P0 that indicates a positive intensity, in peaks of the waveform W0 of the signal. In the same or similar manner, based on the electric signal that is detected by the signal detecting section 6 as a result of a stimulation which, after administration of the muscle relaxant agent, is performed on a nerve by the stimulating section 5, the reaction time calculating section 7 detects a positive peak P1 that indicates a positive intensity, in peaks of the waveform W1 of the signal. Then, the reaction time calculating section 7 calculates the pre-administration reaction time t0 that elapses from the stimulation of the muscle before administration, until the muscle reacts, based on the position of the positive peak P0, and further calculates the post-administration reaction time t1 that elapses from the stimulation of the muscle after administration, until the muscle reacts, based on the position of the positive peak P1.

Therefore, the delay calculating section 8 calculates the delay D of reaction of the muscle after administration of the muscle relaxant agent with respect to the pre-administration, based on the length of the post-administration reaction time t1 with respect to the pre-administration reaction time t.

Next, the operation of Embodiment 1 will be described.

As illustrated in FIG. 1, first, the simulation electrodes 1a and 1b and the detection electrodes 2a and 2b are attached to the skin surface of the living body. For example, the simulation electrodes 1a and 1b may be attached to positions corresponding to the ulnar nerve, and the detection electrodes 2a and 2b may be attached to positions corresponding to the abductor digiti minimi muscle controlled by the ulnar nerve.

Immediately before a muscle relaxant agent is administered to the living body, then, the user operates the operating section 13 to cause the stimulating section 5 to output an electrical stimulation to the ulnar nerve of the living body through the simulation electrodes 1a and 1b.

When the ulnar nerve is electrically stimulated by the stimulating section 5, the abductor digiti minimi muscle controlled by the ulnar nerve reacts to generate electric signals, and the electric signals are received by the detection electrodes 2a and 2b. Then, the signal detecting section 6 performs a differential process on the electric signals that are received by the detection electrodes 2a and 2b, and detects a waveform that is produced as a result of the process, as an electric signal generated in the abductor digiti minimi muscle. The signal detecting section 6 outputs the detection result to the reaction time calculating section 7.

When the detection result of the signal detecting section 6 is input to the reaction time calculating section 7, as illustrated in FIG. 2, the reaction time calculating section 7 detects the positive peak P0 in the waveform W0 of the electric signal, and, based on the position of the positive peak P0, calculates the pre-administration reaction time t0 that, before administration of the muscle relaxant agent, elapses from the electrical stimulation until the abductor digiti minimi muscle reacts.

The pre-administration reaction time t0 is suppled from the reaction time calculating section 7 through the delay calculating section 8 to the storing section 11, to be stored therein.

When the muscle relaxant agent is then administered to the living body, the user operates the operating section 13 to cause the stimulating section 5 to output an electrical stimulation to the ulnar nerve of the living body through the simulation electrodes 1a and 1b. For example, the stimulating section 5 may repetitively output one electrical stimulation at intervals of 15 seconds.

When the ulnar nerve is electrically stimulated, the abductor digiti minimi muscle controlled by the ulnar nerve reacts to generate electric signals, and the electric signals are received by the detection electrodes 2a and 2b. Then, the signal detecting section 6 performs a differential process on the electric signals that are received by the detection electrodes 2a and 2b, and detects a waveform that is produced as a result of the process, as an electric signal generated in the abductor digiti minimi muscle. The signal detecting section 6 outputs the detection result to the reaction time calculating section 7.

When the detection result of the signal detecting section 6 is input to the reaction time calculating section 7, as illustrated in FIG. 2, the reaction time calculating section 7 detects the positive peak P1 in the waveform W1 of the electric signal, and, based on the position of the positive peak P1 calculates the post-administration reaction time t1 indicating the reaction time that, after administration of the muscle relaxant agent, elapses from the electrical stimulation until the abductor digiti minimi muscle reacts.

Figure 3:
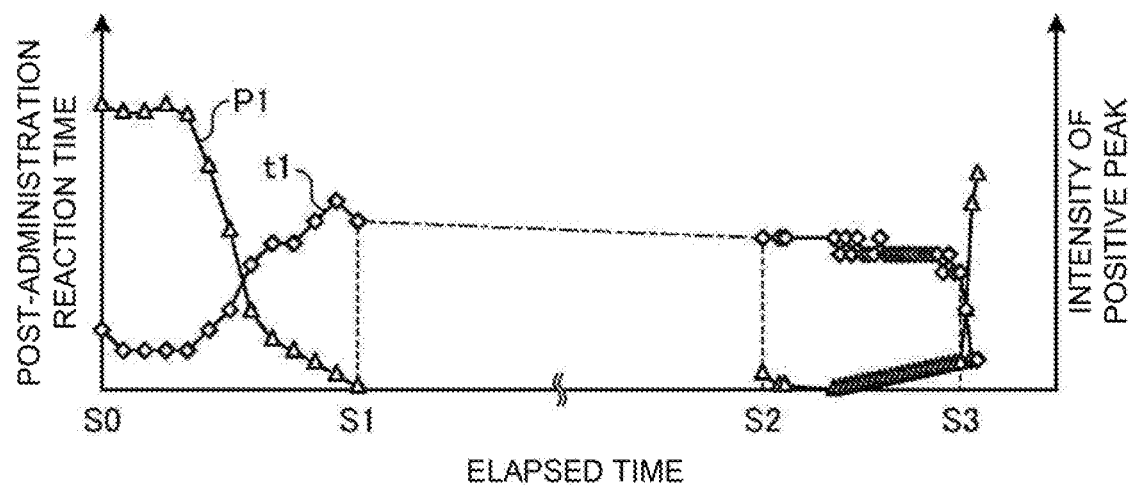
FIG. 3 illustrates transitions of a post-administration reaction time and the intensity of a positive peak with respect to an elapsed time.

FIG. 3 illustrates transitions of the post-administration reaction time t1 that was actually calculated as a result of stimulation in which, after administration of the muscle relaxant agent, one electric electrical stimulation is repetitively performed at intervals of 15 seconds, and the intensity of the positive peak P1 with respect to an elapsed time. Here, the elapsed time means a time period that elapses after the muscle relaxant agent is administered.

As illustrated in FIG. 3, it is seen that, with elapse of time from the start S0 of administration of the muscle relaxant agent, the intensity of the positive peak P1 is reduced, that is, the muscle relaxation status of the living body becomes deeper. It is further seen that the deeper the muscle relaxation status of the living body, the longer the post-administration reaction time t1, and the more the reaction of the abductor digiti minimi muscle is delayed with respect to the electrical stimulation.

When the intensity of the positive peak P1 is then reduced to a very low level, the increase of the post-administration reaction time t1 is stopped, and, after an elapsed time S1, there arises a state where the intensity of the positive peak P1 is zero, that is, the muscle relaxation status of the living body is deep. This state is stably maintained in the range from the elapsed time S1 to an elapsed time S2, and, when the elapsed time S2 then elapses and the intensity of the positive peak P1 begins to become higher, the post-administration reaction time t1 is gradually shortened. When an elapsed time S3 then elapses and the intensity of the positive peak P1 is largely increased, the post-administration reaction time t1 is rapidly reduced. Therefore, it is seen that, when the elapsed time S2 elapses and the muscle relaxation status of the living body begins to become shallower, the reaction of the abductor digiti minimi muscle to an electrical simulation gradually recovers, and, after the elapsed time S3 elapses, the muscle relaxation status of the living body and the reaction of the abductor digiti minimi muscle rapidly recover.

In this way, the post-administration reaction time t1 becomes longer in accordance with the depth of the muscle relaxation status of the living body, and therefore can be used as an index of the muscle relaxation degree indicating the degree of relaxation of the abductor digiti minimi muscle.

Therefore, the reaction time calculating section 7 outputs the calculated post-administration reaction time t1 to the delay calculating section 8.

Here, the reaction time calculating section 7 calculates the post-administration reaction time t1 based on the position of the peak, and therefore can correctly calculate the post-administration reaction time t1 as compared with the case where the post-administration reaction time is calculated based on, for example, the rising position of the waveform W1.

Moreover, the reaction time calculating section 7 calculates the post-administration reaction time t1 based on the position of the positive peak P1. Usually, the positive peak P1 has a high intensity and its position displacement is small as compared with a negative peak, and therefore the post-administration reaction time t1 can be more correctly calculated.

When the post-administration reaction time t1 calculated by the reaction time calculating section 7 is input to the delay calculating section 8, the delay calculating section 8 compares the post-administration reaction time t1 with the pre-administration reaction time t0 stored in the storing section 11. As illustrated in FIG. 2, specifically, the delay calculating section 8 calculates the delay D of the abductor digiti minimi muscle after administration of the muscle relaxant agent with respect to the pre-administration, based on the length of the post-administration reaction time t1 with respect to that of the pre-administration reaction time t0.

The delay D of reaction of the abductor digiti minimi muscle is calculated with reference to the pre-administration reaction time t0. Therefore, the muscle relaxation degree can be correctly calculated as compared with the case where only the length of the post-administration reaction time t is used as an index of the muscle relaxation degree. The calculated delay D of reaction of the abductor digiti minimi muscle is supplied from the delay calculating section 8 to the relaxation degree determining section 9.

When the delay D of reaction of the abductor digiti minimi muscle that is calculated by the delay calculating section 8 is supplied to the relaxation degree determining section 9, the relaxation degree determining section determines the muscle relaxation degree based on the delay D of reaction.

Figure 4:
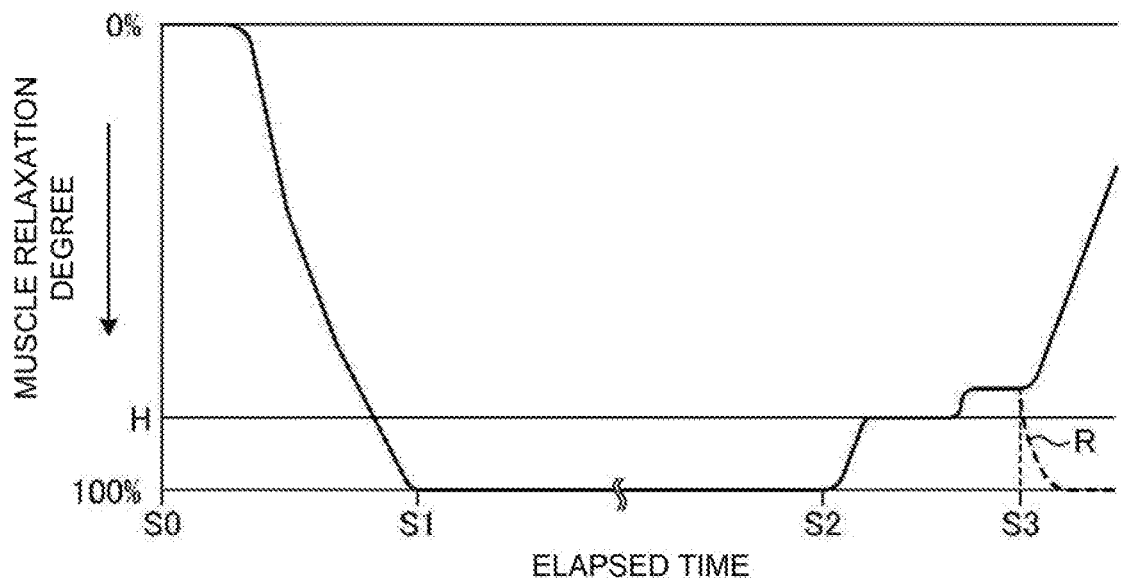
FIG. 4 illustrates the muscle relaxation degree that changes with the elapsed time after administration of a muscle relaxant agent.

As illustrated in FIG. 4, for example, the relaxation degree determining section 9 determines so that the larger the delay D of reaction of the abductor digiti minimi muscle from the start S0 of administration of the muscle relaxant agent, the larger the muscle relaxation degree. When the elapsed time S1 elapses and the intensity of the positive peak P1 becomes zero, the relaxation degree determining section 9 determines that the muscle relaxation degree has the largest value, for example, 100%, that is, the muscle relaxation status is very deep. In the range from the elapsed time S1 to the elapsed time S2, the relaxation degree determining section 9 determines that the muscle relaxation degree is 100%, and, when the elapsed time S2 elapses and the delay D of reaction of the abductor digiti minimi muscle is gradually reduced, decides that the muscle relaxation status begins to recover, and determines that the muscle relaxation status is to be gradually reduced from 100%. When the elapsed time S3 elapses and the delay D of reaction of the abductor digiti minimi muscle is rapidly reduced, the relaxation degree determining section 9 decides that the muscle relaxation status recovers, and determines that the muscle relaxation degree is to be rapidly reduced.

At this time, the relaxation degree determining section 9 preferably sets an index for re-administration of the muscle relaxant agent before the elapsed time S3 elapses. For example, an index value H may set for a muscle relaxation degree in a stage where the muscle relaxation status begins to recover. According to the configuration, at the timing when the muscle relaxation degree exceeds the index value H, the medical person may re-administer the muscle relaxant agent, and the muscle relaxation status may be again deepened as indicated by a muscle relaxation degree R.

As described above, the relaxation degree determining section 9 determines the muscle relaxation degree based on the delay D of reaction of the abductor digiti minimi muscle. Therefore, the stimulating section 5 is requested only to stimulate the abductor digiti minimi muscle one time, and hence the muscle relaxation degree can be accurately monitored with a reduced number of stimulations.

As compared with a muscle relaxation monitoring apparatus of the acceleration sensitive type that monitors the muscle relaxation degree based on the acceleration of the finger or the like of a living body, a muscle relaxation monitoring apparatus of the electromyogram type senses even a very small reaction of the abductor digiti minimi muscle. Therefore, the delay D of reaction of the abductor digiti minimi muscle can be surely measured, and the muscle relaxation degree can be accurately determined.

The relaxation degree determining section 9 supplies the determined muscle relaxation degree to the displaying section 4 through the outputting section 10.

The displaying section 4 sequentially displays muscle relaxation degrees that are determined by the relaxation degree determining section 9, and the medical person can easily know the muscle relaxation degree of the living body.

In the embodiment, the relaxation degree determining section 9 determines the muscle relaxation degree of the living body based on the length of the post-administration reaction time t1 that is calculated by the reaction time calculating section 7. Therefore, it is necessary only that the abductor digiti minimi muscle is simulated one time by the stimulating section 5, and the muscle relaxation degree can be accurately monitored with a reduced number of stimulations. At this time, the relaxation degree determining section 9 determines the muscle relaxation degree of the living body based on the delay D of the abductor digiti minimi muscle that is calculated by the delay calculating section 8, and therefore can determine more accurately the muscle relaxation degree. Therefore, it is possible to provide a muscle relaxation monitoring apparatus and patient monitor that accurately determine the muscle relaxation degree with a reduced number of stimulations.

Embodiment 2

In Embodiment 1 described above, the reaction time calculating section 7 calculates the post-administration reaction time t1 based on the position of the positive peak P1. The information on which the calculation is based is not limited to the position of the positive peak P1 as far as the post-administration reaction time can be calculated based on the position of a peak.

Figure 5:
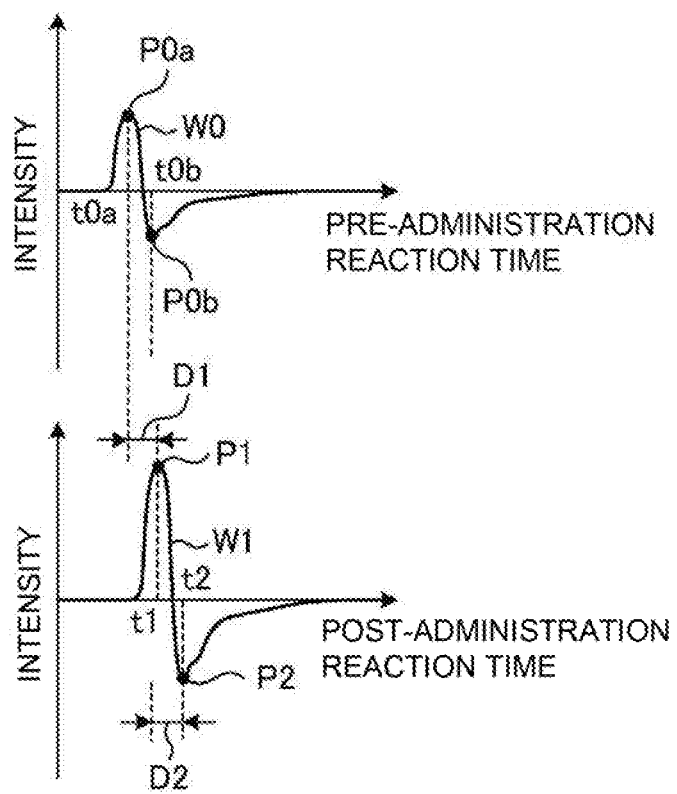
FIG. 5 illustrates a method of calculating a reaction time in Embodiment 2.

In Embodiment 1, for example, the reaction time calculating section 7 may calculate the pre-administration reaction time and the post-administration reaction time based on the positions of the positive and negative peaks. As illustrated in FIG. 5, based on the waveform W0 of the electric signal that is obtained from the abductor digiti minimi muscle before administration of the muscle relaxant agent, specifically, the reaction time calculating section 7 detects a positive peak P0a that indicates a positive intensity, and a negative peak P0b that indicates a negative intensity. In the same or similar manner, based on the waveform W1 of the electric signal that is obtained from the abductor digiti minimi muscle after administration of the muscle relaxant agent, the reaction time calculating section 7 detects the positive peak P1 and a negative peak P2. Then, the reaction time calculating section 7 calculates a pre-administration reaction time t0a based on the position of the positive peak P0a, and a pre-administration reaction time t0b based on the position of the negative peak P0b, the post-administration reaction time t1 based the position of the positive peak P1, and a post-administration reaction time t2 based on the position of the negative peak P2.

According to the configuration, the delay calculating section 8 calculates the delay D1 of the positive peak P1 based on the length of the post-administration reaction time t1 with respect to the pre-administration reaction time ta, and the delay D2 of the negative peak P2 based on the length of the post-administration reaction time t2 with respect to the pre-administration reaction time t0b. Then, the delay calculating section 8 calculates the delay of reaction of the abductor digiti minimi muscle based on the delay D1 of the positive peak P1 and the delay D2 of the negative peak P2. Here, the delay of reaction of the abductor digiti minimi muscle can be calculated by, for example, arithmetic or weighted averaging the delay D1 of the positive peak P1 and the delay D2 of the negative peak P2.

As described above, the reaction time calculating section 7 calculates the post-administration reaction times t1 and t2 based on the positions of the positive and negative peaks P1 and P2. Based on the post-administration reaction times t1 and t2, therefore, the delay calculating section 8 can more accurately calculate the delay of reaction of the abductor digiti minimi muscle.

Alternatively, the reaction time calculating section 7 may calculate one pre-administration reaction time based on the positions of the positive and negative peaks P0a and P0b, and calculate one post-administration reaction time based on the positions of the positive and negative peaks P1 and P2, and, based on the pre-administration reaction time and the post-administration reaction time, the delay calculating section 8 may calculate the delay of reaction of the abductor digiti minimi muscle.

In the embodiment, the reaction time calculating section 7 calculates the post-administration reaction time based on the positions of the positive and negative peaks P1 and P2. Based on the post-administration reaction time, therefore, the delay of reaction of the abductor digiti minimi muscle can be more accurately calculated.

Although, in the embodiment, the reaction time calculating section 7 calculates the pre-administration reaction times t0a and t0b and the post-administration reaction times t1 and t2, only the pre-administration reaction time t0b and the post-administration reaction time t2 may be calculated. According to the configuration, the delay calculating section 8 calculates the delay of reaction of the abductor digiti minimi muscle based on the pre-administration reaction time t0b and the post-administration reaction time t1.

Embodiment 3

In Embodiments 1 and 2 described above, when the delay of reaction of the abductor digiti minimi muscle is to be calculated based on the pre-administration reaction time and the post-administration reaction time, the delay calculating section 8 preferably preforms the calculation by referring to the post-administration reaction times that are calculated by the reaction time calculating section 7 in the previous and earlier times.

Figure 6:
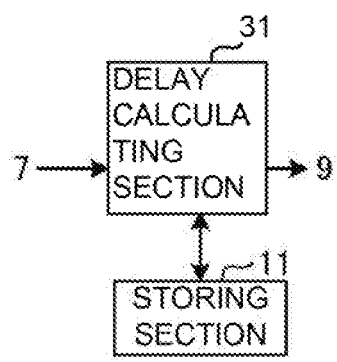
FIG. 6 is a block diagram illustrating main portions of a muscle relaxation monitoring apparatus of Embodiment 3.

As illustrated in FIG. 6, for example, a delay calculating section 31 may be disposed in place of the delay calculating section 8 in Embodiment 1.

The delay calculating section 31 causes post-administration reaction times that are supplied from the reaction time calculating section 7, to be sequentially stored in the storing section 11, and, while referring to the previous and earlier post-administration reaction times that are stored in the storing section 11, calculates the delay of reaction of the abductor digiti minimi muscle based on the pre-administration reaction time and the present post-administration reaction time.

Next, the operation of Embodiment 3 will be described.

In the same or similar manner as Embodiment 1, first, the stimulating section 5 repetitively electrically stimulates the ulnar nerve at predetermined time intervals, and electric signals that are generated in the abductor digiti minimi muscle are sequentially detected by the signal detecting section 6. Then, the reaction time calculating section 7 calculates positive peaks based on the waveforms of the electrical signals detected by the signal detecting section 6.

Figures 7, 8:
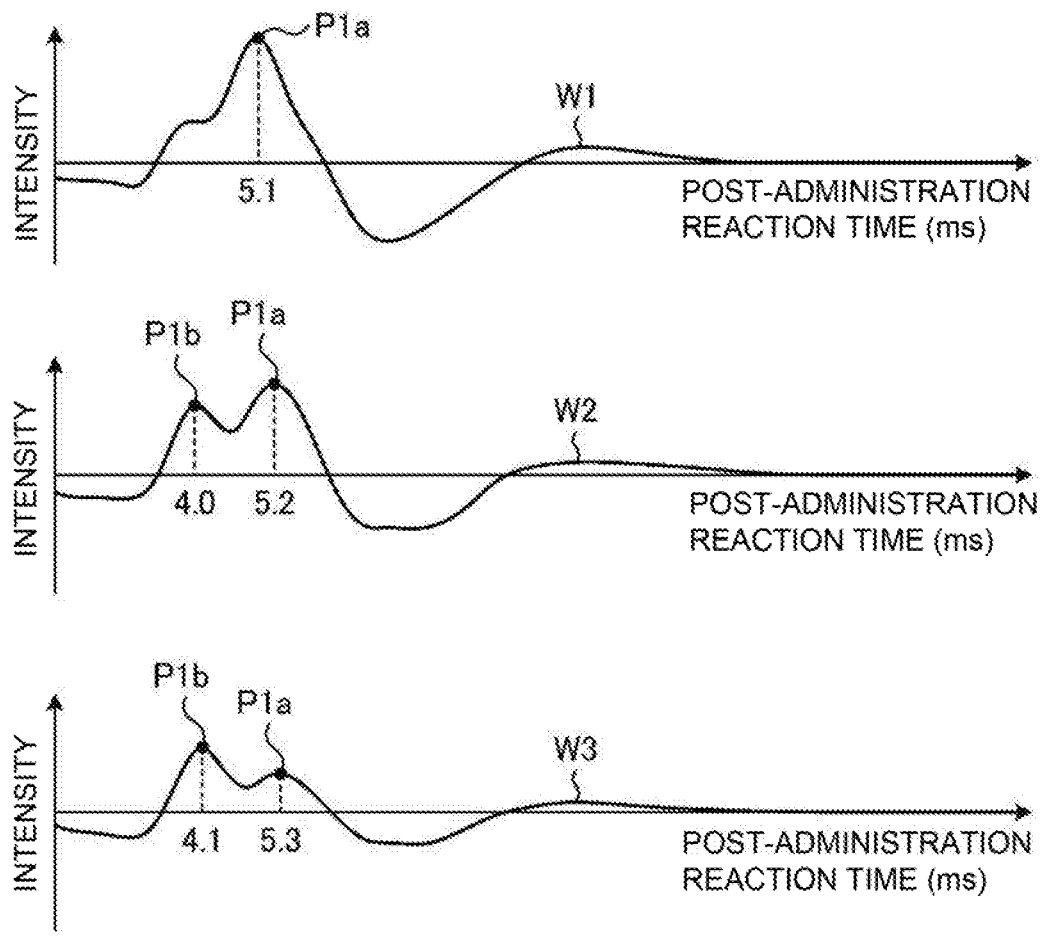
FIG. 7 illustrates the waveforms of electric signals that are detected by a signal detecting section in Embodiment 3.
FIG. 8 illustrates a method of calculating a muscle reaction delay in Embodiment 3.

As illustrated in FIG. 7, for example, the reaction time calculating section 7 detects the positions of positive peaks based on the waveforms W1, W2, and W3 of the electrical signals that are sequentially detected by the signal detecting section 6. Here, one positive peak P1a is detected in the waveform W1 of the electric signal that is initially detected among three electric signals, and two positive peaks P1a and P1b are detected in each of the waveforms W2 and W3 of the electric signals that are next detected. For each of the waveforms W1 to W3, the reaction time calculating section 7 calculates the post-administration reaction time based on the positions of the positive peaks P1a and P1b. For example, the reaction time calculating section 7 calculates the post-administration reaction time of the positive peak P1a of the waveform W1 as 5.1 ms, the post-administration reaction times of the positive peaks P1a and P1b of the waveform W2 as 5.2 ms and 4.0 ms, and the post-administration reaction times of the positive peaks P1a and P1b of the waveform W3 as 5.3 ms and 4.1 ms. The calculated post-administration reaction times are supplied from the reaction time calculating section 7 to the delay calculating section 31.

The delay calculating section 31 causes the post-administration reaction times that are sequentially supplied from the reaction time calculating section 7, to be stored in the storing section 11, and calculates the delay D of reaction of the abductor digiti minimi muscle based on the length of the post-administration reaction time with respect to the pre-administration reaction time.

At this time, the delay calculating section 31 calculates the delay D of reaction of the abductor digiti minimi muscle while referring to the previous and earlier post-administration reaction times that are stored in the storing section 11. As illustrated in FIG. 8, when the post-administration reaction time of 5.1 ms of the waveform W1 is supplied from the reaction time calculating section 7, the delay calculating section 31 compares the supplied post-administration reaction time with the pre-administration reaction time of 5.0 ms of the positive peak P1a that is calculated from the waveform W0 of the electric signal before administration, and calculates the delay D of reaction of the abductor digiti minimi muscle as 0.1 ms. When the post-administration reaction times of 5.2 ns and 4.0 ms of the positive peaks P1a and P1b of the waveform W2 are then supplied from the reaction time calculating section 7, the delay calculating section 31 selects the post-administration reaction time of 5.2 ms of the positive peak P1a that has a higher intensity, compares the selected post-administration reaction time with the pre-administration reaction time of 5.0 ms, and calculates the delay D of reaction of the abductor digiti minimi muscle as 0.2 ms. The delay calculating section 31 is configured so that, in the case where there are a plurality of positive peaks, the delay calculating section selects the positive peak having a higher intensity, and compares the selected positive peak with the pre-administration reaction time of 5.0 ms of the positive peak P1a that is calculated from the waveform W0 of the electric signal before administration. Even in the case where the plurality of positive peaks have similar intensities, the delay calculating section selects the positive peak having a higher intensity.

When the post-administration reaction times of 5.3 ms and 4.1 ms of the positive peaks P1a and P1b of the waveform W3 are supplied from the reaction time calculating section 7, moreover, the delay calculating section 31 selects the post-administration reaction time of 4.1 ms of the positive peak P1b that has a higher intensity; and compares the selected post-administration reaction time with, in place of the pre-administration reaction time 5.0 ms, the pre-administration reaction time of 4.0 ms of the positive peak P1b of the previous waveform W2 that is stored in the storing section 11. Therefore, the delay calculating section 31 calculates the delay of the waveform W3 with respect to the waveform W2 as 0.1 ms, and adds the delay D of 0.2 ms of the waveform W2 with respect to the waveform W0, to the delay of 0.1 ms to calculate the delay D of reaction of the abductor digiti minimi muscle as 0.3 ms.

As described above, while referring to the previous and earlier post-administration reaction times that are stored in the storing section 11, the delay calculating section 31 calculates the delay D of reaction of the abductor digiti minimi muscle based on the pre-administration reaction time and the present post-administration reaction time, and therefore can accurately calculate the value of the delay.

As described above, the calculated delays D of reaction of the abductor digiti minimi muscle are sequentially supplied from the delay calculating section 31 to the relaxation degree determining section 9, and, in the same or similar manner as Embodiment 1, the muscle relaxation degree of the living body is determined by the relaxation degree determining section 9.

According to the embodiment, the delay calculating section 31 calculates the delay D of reaction of the abductor digiti minimi muscle while referring to the previous and earlier post-administration reaction times that are stored in the storing section 11, and therefore can accurately calculate the value of the delay.

In the embodiment, the delay calculating section 31 calculates the delay D of reaction of the abductor digiti minimi muscle while referring to the post-administration reaction times of the previous waveform W2. However, the calculation is requested only to be performed while referring to the previous and earlier post-administration reaction times that are stored in the storing section 11, and the manner of the calculation is not limited to that described above. For example, the delay calculating section 31 may perform the calculation by correcting the delay D of reaction of the abductor digiti minimi muscle based on all previous and earlier post-administration reaction times that are stored in the storing section 11.

Embodiment 4

In Embodiments 1 to 3 described above, the relaxation degree determining section 9 determines the muscle relaxation degree of the living body based only on the length of the post-administration reaction time that is calculated by the reaction time calculating section 7. However, it is preferred that the muscle relaxation degree of a living body is accurately determined while referring to other information.

Figure 9:
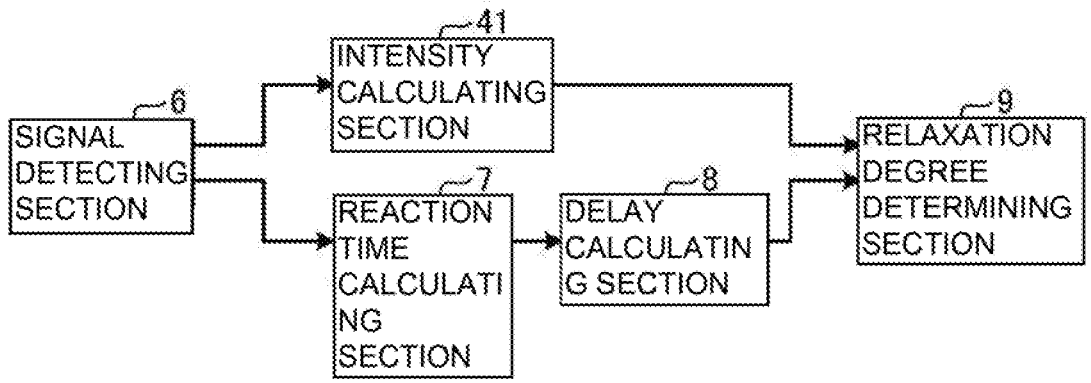
FIG. 9 is a block diagram illustrating main portions of a muscle relaxation monitoring apparatus of Embodiment 4.

As illustrated in FIG. 9, in Embodiment 1, for example, an intensity calculating section 41 that is connected between the signal detecting section 6 and the relaxation degree determining section 9 may be additionally disposed.

The intensity calculating section 41 calculates the intensity of an electric signal that is detected by the signal detecting section, such as the amplitude of the electric signal.

Next, the operation of Embodiment 4 will be described.

In the same or similar manner as Embodiment 1, first, the stimulating section 5 repetitively electrically stimulates the ulnar nerve at predetermined time intervals, and electric signals that are generated in the abductor digiti minimi muscle are sequentially detected by the signal detecting section 6. The signal detecting section 6 supplies the detected electrical signal to the reaction time calculating section 7, and also to the intensity calculating section 41.

In the same or similar manner as Embodiment 1, the reaction time calculating section 7 calculates the post-administration reaction time based on the electric signal that is detected by the signal detecting section 6, and the delay calculating section 8 calculates the delay D of reaction of the abductor digiti minimi muscle based on the post-administration reaction time, and outputs the delay to the relaxation degree determining section 9.

Figure 10:
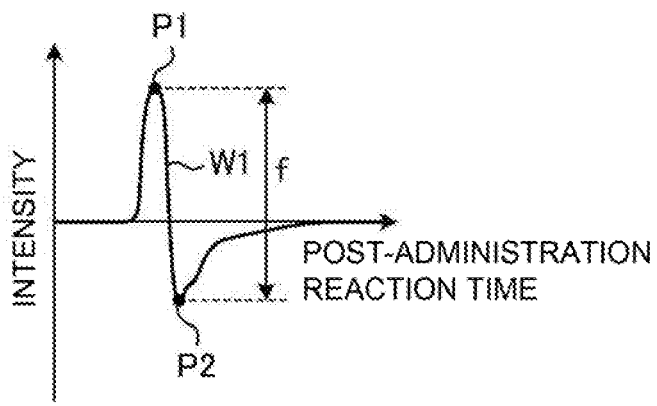
FIG. 10 illustrates the amplitude of an electric signal that is detected by a signal detecting section in Embodiment 4.

On the other hand, the intensity calculating section 41 detects the positions of peaks based on the waveform of the electric signal that is detected by the signal detecting section 6, and calculates the intensities of the peaks. As illustrated in FIG. 10, for example, the intensity calculating section 41 detects the positive peak P1 and the negative peak P2 based on the waveform W1 of the electric signal that is detected by the signal detecting section 6, and calculates the amplitude f of the waveform W1 based on the intensities of the positive peak P1 and the negative peak P2. The calculated amplitude f of the waveform W1 is supplied from the intensity calculating section 41 to the relaxation degree determining section 9.

As illustrated in FIG. 3, here, the intensity of a peak of an electrical signal becomes smaller in accordance with the depth of the muscle relaxation status of the living body. Therefore, it is considered that, in the case where, even when the delay D of reaction of the abductor digiti minimi muscle that is calculated by the delay calculating section 8 becomes large, the intensity of a peak of an electrical signal does not become small, the delay D is not caused by relaxation of the abductor digiti minimi muscle, but caused by noise components.

When the muscle relaxation degree is to be determined based on the delay D of reaction of the abductor digiti minimi muscle that is calculated by the delay calculating section 8, therefore, the relaxation degree determining section 9 performs the determination while removing noise components based on the amplitude f of the waveform W1 that is calculated by the intensity calculating section 41. In the case where the amplitude f of the waveform W1 is not changed, for example, the relaxation degree determining section 9 determines that the electric signal is configured by noise components, and stops the determination of the muscle relaxation degree. By contrast, in the case where the delay D of reaction of the abductor digiti minimi muscle occurs and the amplitude f of the waveform W1 is changed in accordance with the delay D, the relaxation degree determining section 9 determines the muscle relaxation degree based on the delay D of reaction. Therefore, the relaxation degree determining section 9 can determine further accurately the muscle relaxation degree.

According to the embodiment, the relaxation degree determining section 9 eliminates noise components based on the intensity of the electric signal that is calculated by the intensity calculating section 41, and therefore can determine further accurately the muscle relaxation degree.

In Embodiments 1 to 4 described above, the relaxation degree determining section 9 determines the muscle relaxation degree of the living body based on the delay of reaction of the muscle that is calculated by the delay calculating section. However, the determination of the muscle relaxation degree of a living body may be determined based on the length of the reaction time that is calculated by the reaction time calculating section 7, and the manner of the calculation is not limited to that described above.

Figure 11:
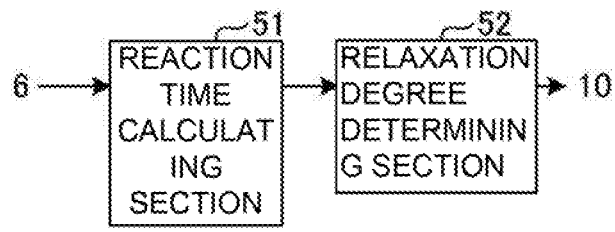
FIG. 11 is a block diagram illustrating main portions of a muscle relaxation monitoring apparatus of modifications of Embodiments 1 to 4.

As illustrated in FIG. 11, in Embodiment 1, for example, a reaction time calculating section 51 and a relaxation degree determining section 52 may be disposed in place of the reaction time calculating section 7 and the relaxation degree determining section 9, and the delay calculating section 8 and the storing section 11 may be eliminated.

The reaction time calculating section 51 calculates a reaction time that elapses from the electrical stimulation of the ulnar nerve by the stimulating section 5 until the electric signal is detected by the signal detecting section 6, based on the detection time when the signal detecting section 6 detects the electric signal.

The relaxation degree determining section 52 determines the muscle relaxation degree of the living body based on the length of the reaction time that is calculated by the reaction time calculating section 51.

According to the configuration, the reaction time calculating section 51 calculates the post-administration reaction time that elapses from the stimulation of the ulnar nerve by the stimulating section 5 after administration of the muscle relaxant agent until the electric signal is detected by the signal detecting section 6. In the relaxation degree determining section 52, an index of the muscle relaxation degree of the living body corresponding to the length of the post-administration reaction time is previously set. Based on the index, the relaxation degree determining section 52 calculates the muscle relaxation degree of the living body corresponding to the length of the post-administration reaction time that is calculated by the reaction time calculating section 51. As described above, the muscle relaxation degree of the living body can be calculated without causing the reaction time calculating section 51 to calculate the pre-administration reaction time before administration of the muscle relaxant agent.

In the above-described of Embodiments 1 to 4, the reaction time calculating section calculates a reaction time based on the position of the peak of the electric signal that is detected by the signal detecting section 6. However, the manner of calculating a reaction time is not limited to this as far as a reaction time can be calculated. For example, the reaction time calculating section may calculate a reaction time based on the rising position or the like of the electric signal that is detected by the signal detecting section 6.

In the above-described of Embodiments 1 to 4, the delay calculating section 8 calculates the delay D of reaction of the muscle after administration with respect to the pre-administration of the muscle relaxant agent, based on the length of the post-administration reaction time with respect to the reaction time before administration of the muscle relaxant agent. Alternatively, the delay calculating section 8 may calculate the muscle reaction delay corresponding to a reaction time (first reaction time) that elapses from a simulation of a muscle nerve by the stimulating section 5 after administration of a muscle relaxant agent, until the electric signal is detected by the signal detecting section 6, and another reaction time (second reaction time) that elapses from a simulation of the muscle nerve by the stimulating section 5 after the first reaction time, until the electric signal is detected by the signal detecting section 6.

In the above-described of Embodiments 1 to 4, the reaction time calculating section 7 calculates a reaction time based on the detection time when the signal detecting section 6 detects an electric signal. However, the manner of calculating a reaction time is not limited to this as far as a reaction time that elapses from a stimulation of a nerve by the stimulating section 5 until a detection of an electric signal by the signal detecting section 6 can be calculated based on detection information of the electric signal detected by the signal detecting section 6. For example, the reaction time calculating section 7 may directly calculate the post-administration reaction time t1 based on the waveform W1 of the electric signal.

In the above-described of Embodiments 1 to 4, the relaxation degree determining section 9 determines the muscle relaxation degree based on the electric signal that is produced by stimulating the ulnar nerve onetime. However, it is requested only to determine the muscle relaxation degree, and the number of stimulation applications is not limited to one. In the case where the electric signal is distorted by noises or the like, for example, the relaxation degree determining section 9 may determine the muscle relaxation degree after the abductor digiti minimi muscle is stimulated a plurality of times.

Although, in the above-described of Embodiments 1 to 4, the stimulating section 5 stimulates the ulnar nerve, the target of stimulation is not limited to the ulnar nerve as far as a nerve leading to a predetermined muscle of a living body can be stimulated.

In the above-described of Embodiments 1 to 4, the displaying section 4 may include the display device, display the muscle relaxation degree that is output from the outputting section 10, and be configured by the muscle relaxation monitoring apparatus 3, or another medical apparatus such as a patient monitor or an electrocardiogram monitor. In the case where the displaying section is a displaying apparatus that is separated from the muscle relaxation monitoring apparatus 3, the displaying section may be a displaying apparatus such as an organic EL display, an inorganic EL display, or a liquid crystal display, or a portable terminal such as a smartphone or a tablet terminal.

Although the above-described of Embodiments 1 to 4 have been described as the muscle relaxation monitoring apparatus 3, the stimulating section 5, signal detecting section 6, reaction time calculating section 7, delay calculating section 8, relaxation degree determining section 9, outputting section 10, storing section 11, and apparatus controller 12 that are to be disposed in the muscle relaxation monitoring apparatus 3 may be mounted in another medical apparatus including the displaying section 4, such as a patient monitor or an electrocardiogram monitor.

The invention claimed is:
1. A muscle relaxation monitoring apparatus comprising:
a stimulating circuit configured to stimulate a nerve of a living body;

a signal detecting circuit configured to detect an electric signal generated by a muscle reacting to the stimulation performed by the stimulating circuit;

a reaction time calculating circuit configured to calculate a reaction time which elapses from the stimulation of the nerve by the stimulating circuit until the electric signal is detected by the signal detecting circuit;

a relaxation degree determining circuit configured to determine a muscle relaxation degree of the living body based on a length of the reaction time calculated by the reaction time calculating circuit; and a displaying section configured to display the muscle relaxation degree, whereby a muscle relaxant agent is administered based on the muscle relaxation degree.

2. The muscle relaxation monitoring apparatus according to claim 1, wherein the reaction time calculating circuit calculates a pre-administration reaction time that elapses from a stimulation of the nerve by the stimulating circuit before administration of a muscle relaxant agent, until the electric signal is detected, and a post-administration reaction time that elapses from a stimulation of the nerve by the stimulating circuit after administration of a muscle relaxant agent, until the electric signal is detected, wherein the apparatus further comprises a delay calculating circuit configured to calculate a delay of reaction of the muscle after administration of the muscle relaxant agent with respect to pre-administration of the muscle relaxant agent based on the pre-administration reaction time and post-administration reaction time that are calculated by the reaction time calculating circuit, and wherein the relaxation degree determining circuit determines the muscle relaxation degree based on the delay of reaction of the muscle that is calculated by the delay calculating circuit.

3. The muscle relaxation monitoring apparatus according to claim 2, wherein the apparatus further comprises a storage configured to sequentially store the post-administration reaction time that is calculated by the reaction time calculating circuit, and wherein the delay calculating circuit calculates the delay of reaction of the muscle by referring to previous and earlier post-administration reaction times that are stored in the storage.

4. The muscle relaxation monitoring apparatus according to claim 1, wherein the reaction time calculating circuit calculates a first reaction time that elapses from a stimulation of the nerve by the stimulating circuit after administration of a muscle relaxant agent, until the electric signal is detected, and a second reaction time that elapses from a stimulation of the nerve by the stimulating circuit after the first reaction time, until the electric signal is detected, wherein the apparatus further comprises a delay calculating circuit configured to calculate a delay of reaction of the muscle corresponding to the second reaction time with respect to reaction of the muscle corresponding to the first reaction time based on the first reaction time and second reaction time that are calculated by the reaction time calculating circuit, and wherein the relaxation degree determining circuit determines the muscle relaxation degree based on the delay of reaction of the muscle that is calculated by the delay calculating circuit.

5. The muscle relaxation monitoring apparatus according to claim 1, wherein the reaction time calculating circuit detects a peak of the electric signal that is detected by the signal detecting circuit, and calculates the reaction time based on a position of the peak.

6. The muscle relaxation monitoring apparatus according to claim 5, wherein the reaction time calculating circuit detects a positive peak that indicates a positive intensity in the electric signal that is detected by the signal detecting circuit, and calculates the reaction time based on a position of the positive peak.

7. The muscle relaxation monitoring apparatus according to claim 5, wherein the reaction time calculating circuit detects a negative peak that indicates a negative intensity in the electric signal that is detected by the signal detecting circuit, and calculates the reaction time based on a position of the negative peak.

8. The muscle relaxation monitoring apparatus according to claim 1, wherein the apparatus further comprises an intensity calculating circuit configured to calculate an intensity of the electric signal that is detected by the signal detecting circuit, and wherein the relaxation degree determining circuit eliminates noise components based on the intensity of the electric signal that is calculated by the intensity calculating circuit.

9. The muscle relaxation monitoring apparatus according to claim 1, wherein the relaxation degree determining circuit being configured to determine the muscle relaxation degree of the living body includes being configured to determine the muscle relaxation degree based on only a single electrical stimulation of the nerve of the living body by the stimulating circuit.

10. A patient monitor comprising:

a stimulating circuit configured to stimulate a nerve of a living body;

a signal detecting circuit configured to detect an electric signal generated by a muscle reacting to the stimulation performed by the stimulating circuit;

a reaction time calculating circuit configured to calculate a reaction time which elapses from the stimulation of the nerve by the stimulating circuit until the electric signal is detected by the signal detecting circuit;

a relaxation degree determining circuit configured to determine a muscle relaxation degree of the living body based on a length of the reaction time calculated by the reaction time calculating circuit; and a displaying section configured to display the muscle relaxation degree, whereby a muscle relaxant agent is administered based on the muscle relaxation degree.

11. The patient monitor of claim 10, wherein the relaxation degree determining circuit being configured to determine the muscle relaxation degree of the living body includes being configured to determine the muscle relaxation degree based on only a single electrical stimulation of the nerve of the living body by the stimulating circuit.

12. A method of monitoring muscle relaxation, comprising:

stimulating a nerve of a living body;

detecting an electric signal generated by a muscle reacting to the stimulation of the nerve;

calculating a reaction time which elapses from the stimulation of the nerve until the electric signal is detected;

determine a muscle relaxation degree of the living body based on a length of the calculated reaction time; and administering a muscle relaxant agent based on the muscle relaxation degree.

13. The method according to claim 12,
wherein the reaction time is calculated by calculating a pre-administration reaction time that elapses from a stimulation of the nerve before administration of the muscle relaxant agent, until the electric signal is detected, and a post-administration reaction time that elapses from a stimulation of the nerve by the stimulating circuit after administration of a muscle relaxant agent, until the electric signal is detected,
further comprising calculating a delay of reaction of the muscle after administration of the muscle relaxant agent with respect to pre-administration of the muscle relaxant agent based on the pre-administration reaction time and post-administration reaction time that are calculated by the reaction time calculating circuit, and determining the muscle relaxation degree based on the delay of reaction of the muscle that is calculated by the delay calculating circuit.

14. The method according to claim 13, further comprising
sequentially storing the post-administration reaction time in a storage, and
calculating the delay of reaction of the muscle by referring to previous and earlier post-administration reaction times that are stored in the storage.

15. The method according to claim 12,
wherein the reaction time is calculated by calculating a first reaction time that elapses from a stimulation of the nerve by the stimulating circuit after administration of a muscle relaxant agent, until the electric signal is detected, and a second reaction time that elapses from a stimulation of the nerve by the stimulating circuit after the first reaction time, until the electric signal is detected, further comprising
calculating a delay of reaction of the muscle corresponding to the second reaction time with respect to reaction of the muscle corresponding to the first reaction time based on the first reaction time and second reaction time, and determining the muscle relaxation degree based on the delay of reaction of the muscle.

16. The method according to claim 12, further comprising detecting a peak of the detected electric signal, and calculating the reaction time based on a position of the peak.

17. The method according to claim 16, further comprising detecting a positive peak that indicates a positive intensity in the electric signal that is detected by the signal detecting circuit, and calculating the reaction time based on a position of the positive peak.

18. The method according to claim 16, further comprising detecting a negative peak that indicates a negative intensity in the electric signal that is detected by the signal detecting circuit, and calculating the reaction time based on a position of the negative peak.

19. The method according to claim 12, further comprising calculating an intensity of the electric signal, and eliminating noise components based on the intensity of the electric signal.

20. The method according to claim 12, wherein the relaxation degree of the living body is determined based on only a single electrical stimulation of the nerve of the living body.

* * * * *